US012759048B2

(12) United States Patent
Zhang et al.

(10) Patent No.: US 12,759,048 B2
(45) Date of Patent: Oct. 13, 2026

(54) NICKEL-BASED SUPERALLOY AND MANUFACTURING METHOD THEREFOR, AND COMPONENT AND APPLICATION

(71) Applicant: GAONA AERO MATERIAL CO., LTD, Beijing (CN)

(72) Inventors: Shaoming Zhang, Beijing (CN); Zhongnan Bi, Beijing (CN); Tian Xia, Beijing (CN); Rui Wang, Beijing (CN); Jinglong Qu, Beijing (CN); Huiping Ma, Beijing (CN); Shoubo Han, Beijing (CN); Guangbao Sun, Beijing (CN)

(73) Assignee: GAONA AERO MATERIAL CO., LTD, Beijing (CN)

( * ) Notice: Subject to any disclaimer, the term of this patent is extended or adjusted under 35 U.S.C. 154(b) by 0 days.

(21) Appl. No.: 17/928,472

(22) PCT Filed: Jun. 18, 2021

(86) PCT No.: PCT/CN2021/100852
§ 371 (c)(1),
(2) Date: Nov. 29, 2022

(87) PCT Pub. No.: WO2021/254480
PCT Pub. Date: Dec. 23, 2021

(65) Prior Publication Data

US 2023/0193424 A1 Jun. 22, 2023

(30) Foreign Application Priority Data

Jun. 19, 2020 (CN) ......................... 202010571208.4

(51) Int. Cl.
*B22F 10/28* (2021.01)
*B22F 10/36* (2021.01)
(Continued)

(52) U.S. Cl.
CPC .............. *B22F 10/28* (2021.01); *B22F 10/36* (2021.01); *B22F 10/366* (2021.01); *B22F 10/64* (2021.01);
(Continued)

(58) Field of Classification Search
CPC .................................................... C22C 19/055
See application file for complete search history.

(56) References Cited

U.S. PATENT DOCUMENTS 5,078,963 A 1/1992 Mallen
2007/0020137 A1 1/2007 Cokain et al.
(Continued)

FOREIGN PATENT DOCUMENTS

CN 103173658 A 6/2013
CN 106717742 A 5/2017
(Continued)

OTHER PUBLICATIONS

Bauer T., et al; "Microstructure and mechanical characterization of SLM processed Haynes 230", Conference Paper, 2015 (Year: 2015).*
(Continued)

*Primary Examiner* — Sally A Merkling
*Assistant Examiner* — Austin Pollock
(74) *Attorney, Agent, or Firm* — Lerner David LLP

(57) ABSTRACT

Provided are a nickel-based superalloy and a manufacturing method therefor, and a component and an application. The nickel-based superalloy is prepared from the following raw materials by means of 3D printing. The raw materials include (mass percent): less than or equal to 0.3% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.2% of Mn, and 0.02-0.2% of Si, with the balance being Ni. Average
(Continued)

carbide size in a tissue is 150-200 nm, and carbide size distribution is 50 nm to 4 μm.

7 Claims, 1 Drawing Sheet

(51) Int. Cl.

| | |
|---|---|
| ***B22F 10/366*** | (2021.01) |
| ***B22F 10/64*** | (2021.01) |
| ***B33Y 10/00*** | (2015.01) |
| ***B33Y 40/20*** | (2020.01) |
| ***B33Y 80/00*** | (2015.01) |
| ***C22C 1/04*** | (2023.01) |
| ***C22C 1/10*** | (2023.01) |
| ***C22C 19/05*** | (2006.01) |

(52) U.S. Cl.

CPC ............... *B33Y 10/00* (2014.12); *B33Y 40/20* (2020.01); *B33Y 80/00* (2014.12); *C22C 1/0433* (2013.01); *C22C 1/10* (2013.01); *C22C 19/055* (2013.01); *B22F 2301/15* (2013.01); *B22F 2304/10* (2013.01); *B22F 2998/10* (2013.01); *B22F 2999/00* (2013.01)

(56) References Cited

U.S. PATENT DOCUMENTS

| | | | | |
|---|---|---|---|---|
| 2013/0160466 | A1 | 6/2013 | Sato et al. | |
| 2018/0015566 | A1* | 1/2018 | Etter | B33Y 10/00 |
| 2022/0143701 | A1 | 5/2022 | Daigo | |
| 2022/0145429 | A1 | 5/2022 | Okada et al. | |

FOREIGN PATENT DOCUMENTS

| | | | |
|---|---|---|---|
| CN | 107617742 | A | 1/2018 |
| CN | 108315599 | A | 7/2018 |
| CN | 108384992 | A | 8/2018 |
| CN | 108796308 | A | 11/2018 |
| CN | 110747377 | A | 2/2020 |
| CN | 111074101 | A | 4/2020 |
| EP | 3269472 | A1 | 1/2018 |
| JP | 2013129880 | A | 7/2013 |
| JP | 2019044209 | A | 3/2019 |
| JP | 2020143311 | A | 9/2020 |
| JP | 2020147781 | A | 9/2020 |

OTHER PUBLICATIONS

Tan Q., et al.; "Precipitation, transformation, and coarsening of carbides in a high carbon Ni-based superalloy during selective laser melting and hot isostatic pressing processes"; J. of Alloys and Compounds; 913, 2022 (Year: 2022).*

Xia T., et al.; "Microstructure and Mechanical Properties of Carbides Reinforced Nickel Matrix Alloy Prepared by Selective Laser Melting"; J. Materials; 2021, 14, 4792 (Year: 2021).*

Metal AM; "Hot Isostatic Pressing: Improving quality and performance in AM parts production"; https://www.metal-am.com/articles/hot-isostatic-pressing-improving-quality-and-performance-in-3d-printing/; retrieved from internet on Feb. 20, 2024; Dec. 1, 2015 (Year: 2015).*

Hallberg E.; "Investigation of hot cracking in additive manufactured nickel-base superalloys"; Thesis; Advanced Engineering Material (Year: 2018).*

International Search Report for Application No. PCT/CN2021/100852 mailed Sep. 16, 2021, pp. 1-4.

First Office Action for Chinese Application No. 202010571208.4 issued Oct. 21, 2020, pp. 1-7.

Notification to Grant Patent Right for Invention for Chinese Application No. 202010571208.4 issued Jan. 7, 2021, 1 page.

Search Report dated Oct. 13, 2020 from the Office Action for Chinese Application No. 202010571208.4, pp. 1-2.

Supplementary Search Report dated Dec. 17, 2020 from the Office Action for Chinese Application No. 202010571208.4, 1 page.

European Search Report for Application No. 21825515.6 dated Nov. 2, 2023, pp. 1-4.

Communication pursuant to Article 94(3) EPC for European Application No. 21825515.6, dated Nov. 15, 2023, 5 pages.

Super Alloy HAYNES(r) 230 (UNS N06230), Nov. 25, 2012. Retrieved from the Internet: https://www.azom.com/article.aspx?ArticleID=7789. 3 pages.

* cited by examiner

NICKEL-BASED SUPERALLOY AND MANUFACTURING METHOD THEREFOR, AND COMPONENT AND APPLICATION

CROSS-REFERENCE TO RELATED APPLICATIONS

The present application is a national phase entry under 35 U.S.C. § 371 of International Application No. PCT/CN2021/100852, filed on Jun. 18, 2021, and now published as International Publication No. WO 2021/254480 A1, which claims priority to Chinese Patent Application No. 202010571208.4, entitled "Nickel-Based Superalloy and Manufacturing Method (Therefor, and Component and Application", filed with the China Patent Office on Jun. 19, 2020, all of which are hereby incorporated herein by reference in the present disclosure.

TECHNICAL FIELD

The present disclosure relates to the technical field of alloys, and particularly, to a nickel-based superalloy and a manufacturing method therefor, and a component and an application.

BACKGROUND ART

Superalloys have good oxidation resistance and corrosion resistance, as well as high strength at high temperatures, and are thus critical materials for hot-end components of aviation and aerospace power systems. With the continuous development of the aviation and aerospace industries, the design requirements of core components are accordingly increased. A large number of complex internal flow channels and thin-walled structures are present inside the parts. The superalloys obtained by the traditional casting, forging and welding process can no longer meet the design requirements.

SUMMARY

It is an object of the present disclosure to provide a nickel-based superalloy and a manufacturing method therefor. The alloy has no cracks on the surface and inside, has high strength at high temperatures and excellent performance even at a temperature of 1100° C., and can thus meet the use requirements of aviation and aerospace.

In a first aspect, the present disclosure provides a nickel-based superalloy prepared by 3D printing using the following raw material.

The raw material includes the following composition by mass percentage: less than or equal to 0.3% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.2% of Mn, and 0.02-0.2% of Si, with a balance being Ni.

The nickel-based superalloy has no cracks. In the microstructure of the nickel-based superalloy, the average size of carbide is 150-200 nm, and the size distribution of the carbide is 50 nm-4 μm.

In one or more embodiments, the raw material includes the following composition by mass percentage:

0.05-0.3% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.1% of Mn, and 0.02-0.1% of Si, with a balance being Ni.

In one or more embodiments, the raw material includes the following composition by mass percentage:

0.08-0.25% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.06% of Mn, and 0.02-0.06% of Si, with a balance being Ni.

In one or more embodiments, the carbide in the nickel-based superalloy includes primary carbides and secondary carbides;

the primary carbide has a size of 200 nm-4 μm and is located in a W and Mo element enriched region between dendrites and cellular crystals; and the secondary carbide has a size of 50-150 nm and is located partially at the interface and partially inside the grain.

In one or more embodiments, the 3D printing includes selective laser melting or electron beam melting, and is for example selective laser melting.

In one or more embodiments, the nickel-based superalloy is prepared by the following steps: firstly processing the raw material into powders with particle size of 15-75 μm, and then performing the selective laser melting.

In one or more embodiments, the selective laser melting is followed by hot isostatic pressing and heat treatment.

In one or more embodiments, the nickel-based superalloy has a yield strength greater than or equal to 50 MPa at 1100° C.; and in one or more embodiments, the obtained nickel-based superalloy before hot isostatic pressing has a density greater than or equal to 99%, and the nickel-based superalloy obtained after hot isostatic pressing has a density greater than or equal to 99.95%.

In one or more embodiments, the process parameters in the selective laser melting process include:

(a) laser power: 100-700 W;
(b) laser scanning speed: 600-2000 mm/s;
(c) spot diameter: 40-110 μm;
(d) laser spacing: 80-120 μm; and
(e) powder thickness: 20-80 μm.

In a second aspect, the present disclosure provides a method for manufacturing a nickel-based superalloy, including the following step:

preparing the nickel-based superalloy by 3D printing using the raw material for the nickel-based superalloy described above.

In one or more embodiments, the 3D printing includes selective laser melting or electron beam melting, and is for example selective laser melting.

In one or more embodiments, the raw material is firstly processed into powders with particle size of 15-75 μm, and then the selective laser melting is performed to obtain the nickel-based superalloy.

In one or more embodiments, the method includes following steps: firstly processing the raw material into powders with particle size of 15-75 μm, and then performing the selective laser melting 3D printing, followed by performing hot isostatic pressing and heat treatment, to obtain the nickel-based superalloy.

In one or more embodiments, the process parameters in the selective laser melting process include:

(a) laser power: 100-700 W;
(b) laser scanning speed: 600-2000 mm/s;
(c) spot diameter: 40-110 μm;
(d) laser spacing: 80-120 μm; and
(e) powder thickness: 20-80 μm.

In a third aspect, the present disclosure provides a component including the nickel-based superalloy described above or a nickel-based superalloy manufactured by the manufacturing method described above.

In a fourth aspect, the present disclosure provides an aviation or aerospace engine, an aircraft or a gas turbine, including the component described above.

Compared with the prior art, the present disclosure can achieve at least the following advantageous effects.

In the present disclosure, a nickel-based superalloy is prepared by 3D printing, especially selective laser melting method, using a material of specific elemental composition. The present disclosure can impart a special structure to the alloy, which thus provides dense and crack-free complex components that satisfies strength requirements in high temperature environments.

A material of specific elemental composition can significantly reduce its crack sensitivity in the process of 3D printing especially selective laser melting is applied, and even a material of a nickel alloy composition with a high carbon content can maintain a non-cracking state. The resulting alloy has no cracks on the surface and inside, has high strength at high temperatures and excellent performance even at a service temperature of 1100° C.

In addition, in one or more embodiments, the use of process parameters suitable for the alloy material allows the resulting alloy to have excellent high-temperature performance.

DETAILED DESCRIPTION OF THE EMBODIMENTS

Figure 1:
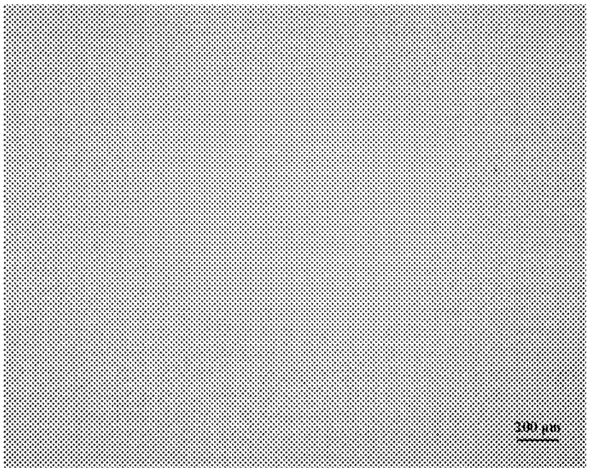
FIG. 1 is a metallographic structure image of the superalloy sample in Example 1.

In order to make the objects, technical solutions and advantages of the examples of the present disclosure clearer, the technical solutions in the examples of the present disclosure will be described clearly and completely below with reference to the accompanying drawings for the examples of the present disclosure. Obviously, the described examples are some, but not all, examples of the present disclosure. Generally, the components in the examples of the disclosure, described and illustrated in the accompanying drawings herein, may be arranged and designed in a variety of different configurations.

Mechanical parts made by traditional casting, forging and welding process can no longer meet the design requirements in the aviation and aerospace field. 3D printing technology is used in order to improve the performance of mechanical parts.

When 3D printing technology was used for high-performance superalloys, it is found that although there are many types of existing high-performance superalloys, they were all developed for traditional preparation processes. In order to ensure printability, the superalloy materials currently used in the field of 3D printing mainly include IN625, IN718, Hastelloy X, and the like. At present, three grades of superalloys, namely Hastelloy X (domestic grade GH3536), Inconel 625 (domestic grade GH3625) and Inconel 718 (domestic grade GH4169), have been researched and optimized, and relatively mature printing technology has been developed to print the combustion chamber and other components in an aviation or aerospace engine.

GH3230 alloy, a nickel-based wrought superalloy, involves a traditional process route including casting, forging, rolling, and the like. It can be used for a long period of time above 1000° C., superior to IN718, IN625, HastelloyX and the other alloys. GH3230 alloy has certain weldability as well, and thus is feasible to be used for 3D printing process.

The inventors found that the printed components of GH3230 alloy are prone to having crack defects under the special process conditions of 3D printing, especially when preparing complex structures.

The present disclosure is improved on the basis of the alloy composition of GH3230, so as to better adapt to the special process requirements of 3D printing, solve the technical problem of cracking, and ensure the usage performance at 1100° C.

In one aspect, the present disclosure provides a nickel-based superalloy prepared by 3D printing using the following raw material. The raw material includes the following composition by mass percentage: less than or equal to 0.3% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.2% of Mn, and 0.02-0.2% of Si, with a balance being Ni. The nickel-based superalloy has no cracks. In the microstructure of the nickel-based superalloy, the average size of carbide is 150-200 nm, and the size distribution of the carbide is 50 nm-4 μm.

The raw material includes: less than or equal to 0.3% of C (for example, 0.01%, 0.02%, 0.05%, 0.08%, 0.09%, 0.1%, 0.12%, 0.15%, 0.16%, 0.18%, 0.2%, 0.22%, 0.24%, 0.25%, 0.26%, 0.28%, or 0.3%, etc.), less than 5% of Co (for example, 0.01%, 0.1%, 1%, 2%, 3%, 4%, or 4.8%, etc.), 13-15% of W (for example, 13%, 13.5%, 14%, 14.5%, or 15%, etc.), 20-24% of Cr (for example, 20%, 21%, 22%, or 24%, etc.), 1-3% of Mo (for example, 1%, 2%, or 3%, etc.), 0.2-0.5% of Al (for example, 0.2%, 0.3%, 0.4%, or 0.5%, etc.), less than 0.1% of Ti (for example, 0.01%, 0.02%, 0.03%, 0.04%, 0.05%, 0.06%, 0.07%, 0.08%, or 0.09%, etc.), less than 3% of Fe (for example, 0.01%, 0.1%, 0.5%, 1%, 1.5%, 2%, 2.5%, or 2.9%, etc.), less than 0.015% of B (for example, 0.001%, 0.002%, 0.005%, 0.008%, 0.01%, or 0.014%, etc.), 0.001-0.004% of La (for example, 0.001%, 0.002%, 0.003%, or 0.004%, etc.), 0.01-0.2% of Mn (for example, 0.01%, 0.02%, 0.03%, 0.04%, 0.05%, 0.06%, 0.08%, 0.1%, 0.12%, 0.15%, 0.16%, 0.18%, or 0.2%, etc.), 0.02-0.2% of Si (for example, 0.02%, 0.05%, 0.06%, 0.08%, 0.1%, 0.12%, 0.15%, 0.16%, 0.18%, or 0.2%, etc.), and the balance of Ni.

It should be noted that the balance of Ni means that other optional ingredients (total elements in residual ingredients or impurities) may also be included in the raw material, in addition to the other ingredients than Ni mentioned above. That is, in the raw material, the sum of the mass percentages of Ni, other ingredients than Ni, and other optional ingredients is 100%.

Cr has a solid solution strengthening effect in a nickel-based superalloy, and forms an oxide layer on the metal surface at high temperatures to improve the oxidation resistance of the alloy. However, if the Cr content exceeds 24%, the precipitation of harmful secondary phases would be promoted, the cracking tendency would be increased, and high-temperature mechanical properties of the alloy would be affected. Therefore, in the nickel-based superalloy raw material of the present disclosure, the Cr content is controlled at 20-24%.

Al is capable of forming a dense oxide film to improve the oxidation resistance of a nickel-based superalloy. In the nickel-based superalloy raw material of the present disclosure, the Al content is controlled at 0.2-0.5%.

W has a solid solution strengthening effect in a nickel-based superalloy. However, the W content exceeding 15% would promote the formation of harmful TCP phase. Therefore, in the nickel-based superalloy raw material of the present disclosure, the W content is controlled at 13-15%.

C is capable of forming carbide in a nickel-based superalloy and has a strengthening effect at high temperatures. However, after the traditional casting and forging process, excessive C content would cause precipitation of carbide at the grain boundaries, leading to formation of a continuous carbide film, which is not conducive to the mechanical properties of the alloy. Therefore, the C content of the existing GH3230 alloy is controlled at 0.05-0.15%. However, due to the process characteristics of rapid solidification and rapid cooling in a 3D printing process, the carbide tends to form fine and dispersedly distributed substance, which serves as a strengthening phase to improve mechanical properties. Therefore, the upper limit of the C content in the nickel-based superalloy raw material of the present disclosure is increased from 0.15% to 0.3%.

Si is advantageous to improve the oxidation resistance of alloys. The Si content in the existing GH3230 alloy is 0.25-0.75%. However, in a 3D printing process, Si would significantly increase the cracking tendency, and thus the content of Si needs to be strictly limited. Therefore, the Si content in the nickel-based superalloy raw material of the present disclosure is controlled at 0.02-0.2%.

Mn is a deoxidizing element and can react with sulfur to form MnS, thus mitigating harmful effects of sulfur. The Mn content in the existing GH3230 alloy is 0.3-1%. However, Mn would increase the cracking tendency during the printing. Therefore, the Mn content in the nickel-based superalloy raw material of the present disclosure is controlled at 0.01-0.2%.

La element affects the composition and morphology of an oxide film of a nickel-based superalloy, and improves the oxidation resistance and high-temperature mechanical properties of a nickel-based superalloy. The La content in the existing GH3230 alloy is 0.005-0.05%. However, during the 3D printing process, La element may undergo segregation or form lanthanide, which increase the cracking tendency. Therefore, the La content in the nickel-based superalloy raw material of the present disclosure is controlled at 0.001-0.004%.

B is a grain boundary strengthening element, and an appropriate amount of B element can improve the grain boundary strength of a nickel-based superalloy. However, if the B content is higher than 0.015%, a large amount of boride is formed, which is not conducive to the mechanical properties of the alloy, and the resulting low-melting-point boride would also increase the cracking tendency during the printing. Therefore, the B content in the nickel-based superalloy raw material of the present disclosure is controlled to be less than 0.015%.

In some typical embodiments, the raw material includes the following composition by mass percentage: 0.05-0.3% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.1% of Mn, and 0.02-0.1% of Si, with a balance being Ni.

In some more typical embodiments, the raw material includes the following composition by mass percentage:

0.08-0.25% of C, less than 5% of Co, 13-15% of W, 20-24% of Cr, 1-3% of Mo, 0.2-0.5% of Al, less than 0.1% of Ti, less than 3% of Fe, less than 0.015% of B, 0.001-0.004% of La, 0.01-0.06% of Mn, and 0.02-0.06% of Si, with a balance being Ni.

The raw material is, for example, a powder.

In one or more embodiments, the 3D printing includes selective laser melting or electron beam melting, is for example selective laser melting.

Selective laser melting (SLM) process is a rapid 3D printing technology that can melt metal powder layer by layer, and finally achieve near net shape of metal parts with high density without abrasive tool. Selective laser melting technology has the characteristics of high forming efficiency and can prepare parts with a complex structure, and has become the most potential manufacturing technology for superalloy parts with a complex structure.

Specifically, the nickel-based superalloy is prepared by following steps: firstly processing the raw material described above into powders with the particle size of 15-75 μm, and then performing selective laser melting. In one or more embodiments, hot isostatic pressing and heat treatment are performed after selective laser melting to obtain a nickel-based superalloy.

In one or more embodiments, the process parameters in the selective laser melting process include:

(a) a laser power of 100-700 W, such as 100 W, 200 W, 300 W, 400 W, 500 W, 600 W, or 700 W;

(b) a laser scanning speed of 600-2000 mm/s, such as 600 mm/s, 700 mm/s, 800 mm/s, 900 mm/s, 1000 mm/s, 1200 mm/s, 1500 mm/s, 1800 mm/s, or 2000 mm/s;

(c) a spot diameter of 40-110 μm, such as 40 μm, 50 μm, 60 μm, 70 μm, 80 μm, 90 μm, 100 μm, or 110 μm;

(d) a laser spacing of 80-120 μm, such as 80 μm, 90 μm, 100 μm, 110 μm, or 120 μm; and (e) a powder thickness of 20-80 μm, such as 20 μm, 30 μm, 40 μm, 50 μm, 60 μm, 70 μm, or 80 μm.

The process parameters in SLM are selected to render the volumetric energy density $E_v$ of laser to range from 50-100 J/mm$^3$ during selective laser melting in the present disclosure. $E_v$ is calculated as follows:

$$E_v = \frac{P}{V \cdot H \cdot t}$$

where P is the laser power, V is the laser scanning speed, H is the laser spacing, and t is the powder thickness.

Through the interaction of the four process parameters, volumetric energy density $E_v$ of laser is kept within the range of 50-100 J/mm$^3$ during selective laser melting. If $E_v$ is out of this range, a large number of voids and defects would be formed inside the alloy, resulting degradation of alloy properties.

The raw material used in the nickel-based superalloy of the present disclosure is particularly suitable for selective laser melting by controlling the content of Si, Mn, and La in the composition, so that the crack sensitivity during the laser melting forming process of selected region is significantly reduced. In addition to significantly reduced crack sensitivity, owing to a high C content in the raw material, the resulting nickel-based superalloy has a high strength at high temperatures and excellent performance even at a service temperature of 1100° C.

In the present disclosure, through the interaction of the contents of individual ingredients, the printed alloy product can still be kept from cracking, although the nickel alloy composition has a high carbon content.

The nickel-based superalloy formed by 3D printing using the raw material composition described above has no cracks on the surface and inside, and the size of carbide therein is significantly smaller and distributed more dispersedly than those of as-cast and as-forged GH3230 alloy.

The average size of carbide is 150-200 nm (for example, 160, 170, 180, or 190 nm), the size distribution of carbide is 50 nm-4 μm (including, for example, 50-100 nm, 50-150 nm, 50-200 nm, 300 nm-4 μm, 300 nm-2 μm, 500 nm-2 μm, 200 nm-3 μm, or the like).

In one or more embodiments, as a typical microstructure in the nickel-based superalloy, the carbide includes primary carbides and secondary carbides.

The primary carbide has a size of 200 nm-4 μm (which may be, for example, 200 nm-1 μm, 200 nm-2 μm, 200 nm-3 μm, 300 nm-1 μm, 300 nm-2 μm, 300 nm-3 μm, 300 nm-4 μm, 400 nm-1 μm, 400 nm-2 μm, 400 nm-3 μm, 400 nm-4 μm, 500 nm-1 μm, 500 nm-2 μm, 500 nm-3 μm, and 500 nm-4 μm), and is located in a W and Mo element enriched region between dendrites and cellular crystals.

The secondary carbide has a size of 50-150 nm (which may be, for example, 50-100 nm, 60-120 nm, 70-130 nm, 80-140 nm, 90-150 nm, 100-150 nm), and is located partially at the interface and partially inside the grain.

The nickel-based superalloy of the present disclosure is proposed in response to the applicability and the existing cracking problem resulting from printing in the 3D printing process. The alloy raw material is optimized and improved on the basis of the original GH3230 alloy composition to achieve good weldability, and almost no cracking phenomenon occurs during selective laser melting, and high strength at high temperatures is achieved. In one or more embodiments, owing to the interactions of various process parameters and raw material ingredients in the printing process, an alloy product with high density, no cracks, and high strength in a high temperature environment is obtained.

Typically, the nickel-based superalloy of the present disclosure has a yield strength at a high temperature (1100° C.) greater than or equal to 50 MPa (for example, 55 MPa, 56 MPa, 58 MPa, or 60 MPa).

The yield strength is determined according to the tensile testing for metallic materials (GB/T 228.1-2010).

Typically, the elongation after fracture of the nickel-based superalloy of the present disclosure at room temperature is greater than or equal to 16%.

The elongation after fracture is determined according to the tensile testing for metallic materials (GB/T 228.1-2010).

Typically, the density of the nickel-based superalloy obtained before hot isostatic pressing is greater than or equal to 99%, and the density of the nickel-based superalloy obtained after hot isostatic pressing is greater than or equal to 99.95%.

The density is determined according to GB/T 3850-2015 “Impermeable sintered metal materials and hardmetals—Determination of density”.

In another aspect, the present disclosure provides a method for manufacturing a nickel-based superalloy, including following step: preparing the nickel-based superalloy by 3D printing using the raw material for the nickel-based superalloy described above.

The method disclosed in the present disclosure selects a material with a specific elemental composition, and provides a nickel-based superalloy through 3D printing. The proposed method provides a novel approach to obtain dense and crack-free alloy parts with excellent high-temperature performance.

In some embodiments, the 3D printing includes selective laser melting or electron beam melting and is for example selective laser melting In one or more embodiments, the raw material is firstly processed into powders with a particle size of 15-75 μm, and then the selective laser melting is performed to obtain the nickel-based superalloy.

In some embodiments, the method includes following steps: firstly processing the raw material into powders with a particle size of 15-75 μm, then performing the selective laser melting 3D printing, and then performing hot isostatic pressing to obtain a nickel-based superalloy having a density after hot isostatic pressing greater than 99.95%, followed by heat treatment to achieve the required mechanical properties.

In some embodiments, the process parameters in the selective laser melting 3D printing process include:

(a) laser power: 100-700 W;

(b) laser scanning speed: 600-2000 mm/s;

(c) spot diameter: 40-110 μm;

(d) laser spacing: 80-120 μm; and (e) powder thickness: 20-80 μm.

The description on the terms in the manufacturing method is consistent with the corresponding description on the nickel-based superalloy of the first aspect, and will not be repeated here.

The nickel-based superalloy obtained by the manufacturing method has the same structure, morphology and properties as the nickel-based superalloy of the first aspect. The size of the carbide in the nickel-based superalloy formed by selective laser melting is significantly smaller and has more dispersed distribution than those of the as-cast and as-forged GH3230 alloy. Application of the material with the specific elemental composition for the nickel-based superalloy of the present disclosure to the method of the present disclosure enables the manufactured parts to be less prone to cracking and have excellent performance.

In another aspect, the present disclosure provides a component including the nickel-based superalloy described above or a nickel-based superalloy manufactured by the manufacturing method described above.

Consequently, the component has no cracks on the surface and inside, has a high density, and has high strength at high temperatures, and can thus meet the use requirements of aviation and aerospace.

Typical but non-limiting examples of the component include an air-inlet, a flame tube, a heat shield, and the like of an engine.

In another aspect, the present disclosure provides an aviation or aerospace engine, an aircraft or a gas turbine, including the component described above.

It can be understood that the aviation or aerospace engine, the aircraft or the gas turbine have the same advantages as the nickel-based superalloy and the component of the present disclosure, which will not be repeated here.

Some embodiments of the present disclosure will be described in detail below with reference to the examples. The following examples and features of the examples may be combined with each other without conflict. The examples for which specific conditions are not indicated are carried out according to the conventional conditions or the conditions recommended by the manufacturers. The used reagents or instruments for which the manufacturers are not indicated are all conventional products that can be purchased from the market.

EXAMPLE 1

A nickel-based superalloy raw material for 3D printing included the following composition by mass percentage: 0.3% C, 22% Cr, 14% W, 2% Mo, 0.5% Fe, 0.4% Al, 0.01% Ti, 0.02% Si, 0.01% Mn, 0.01% B, 0.001% La, and the balance of Ni.

The nickel-based superalloy raw material for 3D printing described in Example 1 was processed into powders of 15-75 μm, and the powder was subjected to selective laser melting technology (SLM), with the printing process using a laser power of 240 W, a laser scanning speed of 1000 mm/s, a spot diameter of 100 μm, a laser spacing of 90 μm, and a powder thickness of 30 μm, to prepare a superalloy sample.

The metallographic structure observation and density measurement of the obtained superalloy sample were carried out.

As shown in FIG. 1, the superalloy sample has a uniform, dense, and crack-free metallographic structure, and the density measurement result is 99.2%.

Figure 2:
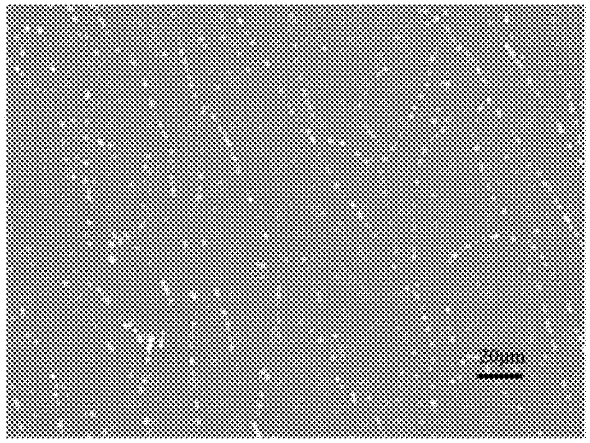
FIG. 2 is a microstructure image of the superalloy sample in Example 1.

The microstructure of the superalloy sample is shown in FIG. 2. The grains are distributed in a long cellular shape along a deposition direction. A large number of carbide particles are precipitated at the grain boundaries (including cell boundaries), and fine carbide is evenly distributed inside the grains. The carbide in the superalloy sample mainly includes primary carbides in a large size (200 nm-4 μm), which is precipitated from the liquid phase during the solidification process, and mostly located in a region enriched with W, Mo and other elements between dendrites and cellular crystals. In addition, secondary carbides precipitated from the solid phase is relatively small (50-150 nm), and located partially at the interface and partially inside the grains.

The size of the carbide in the alloy formed by 3D printing is significantly smaller and has more dispersed distribution than those of an as-cast and as-forged alloy. The average size of carbide is 150-200 nm. The smallest one reaches tens of nm, and the largest one does not exceed 5 μm.

Generally, carbide has higher hardness than austenite matrix, and may reduce the interface bonding strength of the material and affect the mechanical properties of the alloy especially when it is continuously distributed at the interface. On the contrary, the small size carbide that is discontinuously distributed in this example exhibits a strengthening effect.

The 3D printed superalloy sample in this example and a cast alloy sample prepared by a casting process using the nickel-based superalloy raw material described above have tensile properties at room temperature (25° C.) and high temperatures as listed in Table 1 below.

The preparation method of the cast alloy sample involved casting using the composition of the above-mentioned nickel-based superalloy raw material for 3D printing. The method specifically included the following steps:

(1) high-purity elemental materials such as Co, Al, W, Ti, Ni, Fe, Cr, Mo, C, B, Mn, Si, and La were weighed according to the composition ratio;

(2) the elemental materials with a relatively low melting point, such as Co, Ni, and Cr, were placed at the bottom of a crucible, and the refractory elemental materials, such as W and Mo, were placed thereon, and Al, Ti, B, and the other elemental materials were placed in a hopper, so as to add them during the melting process; and (3) melting was conducted in a vacuum induction furnace: heating was first conducted at a low power (about 120 kW) to eliminate the gas attached on the raw material, then the temperature was increased rapidly to above 1500° C. by a high power (about 200 kW) and kept for 10 minutes, then the temperature was lowered to about 1300-1400° C. and kept for 5 minutes, subsequently Al, Ti, B and the other elemental materials in the hopper were added, the temperature was increased to above 1500° C. and kept for 15 minutes, and consequently the resultant was cast into a superalloy ingot.

TABLE 1

| | Yield strength $\sigma_b$ (MPa) | |
|---|---|---|
| | Cast alloy sample | 3D printed superalloy sample |
| Room temperature | 333 | 380 |
| 900° C. | 166 | 218 |
| 1000° C. | 85 | 117 |
| 1100° C. | 57 | 75 |

As set forth in Table 1, the tensile properties of the cast alloy sample in this example and the 3D printed superalloy sample at room temperature and high temperatures are compared, the yield strength of the 3D printed superalloy sample at different temperatures was higher than that of the cast alloy sample.

EXAMPLES 2-4

The mass percentages of individual ingredients of the nickel-based superalloy raw material for 3D printing in Examples 2-4 are listed in Table 2, and the others are the same as in Example 1.

TABLE 2

| | C | Co | W | Cr | Mo | Al | Ti | Fe | B | La | Mn | Si | Ni |
|---|---|---|---|---|---|---|---|---|---|---|---|---|---|
| Example 2 | 0.08 | — | 13 | 20 | 1 | 0.2 | 0.1 | 3 | 0.015 | | | | balance |
| Example 3 | 0.3 | — | 15 | 24 | 3 | 0.5 | — | — | — | 0.004 | 0.2 | 0.2 | balance |
| Example 4 | 0.08 | — | 14 | 22 | 2 | 0.3 | 0.1 | 3 | 0.013 | 0.004 | 0.2 | 0.2 | balance |

COMPARATIVE EXAMPLES 1-3

The mass percentages of individual ingredients of the nickel-based superalloy raw material for 3D printing in Comparative Examples 1-3 are listed in Table 3, and the others are the same as in Example 1.

TABLE 3

| | C | Co | W | Cr | Mo | Al | Ti | Fe | B | La | Mn | Si | Ni |
|---|---|---|---|---|---|---|---|---|---|---|---|---|---|
| Comparative Example 1 | 0.05 | — | 13 | 20 | 1 | 0.2 | 0.1 | 3 | 0.015 | 0.005 | 0.3 | 0.25 | balance |
| Comparative Example 2 | 0.3 | — | 13 | 20 | 1 | 0.2 | 0.1 | 3 | 0.01 | 0.005 | 0.3 | 0.25 | balance |
| Comparative Example 3 | 0.15 | — | 13 | 22 | 1 | 0.5 | 0.05 | 2 | 0.01 | 0.05 | 1 | 0.75 | balance |

Figure 3:
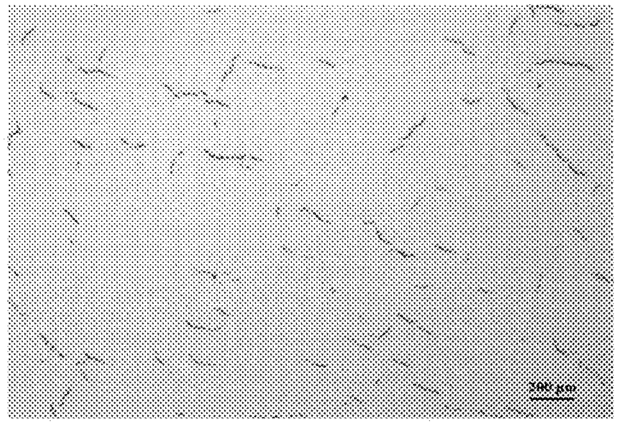
FIG. 3 is a metallographic structure image of the alloy sample in Comparative Example 3.

Each of the alloy raw materials of Examples 2-4 and Comparative Examples 1-3 was processed into powders of 15-75 μm, and the powder was subjected to selective laser melting technology (SLM) as in Example 1 to prepare the alloy sample. Here, the metallographic structure image of the alloy sample prepared from the alloy powder of Comparative Example 3 is shown in FIG. 3, showing that its metallographic structure has a large number of microcracks. The yield strength of each alloy sample at room temperature (25° C.) is shown in Table 4 below.

TABLE 4

| | Yield strength $\sigma_b$(MPa) | Elongation after fracture (%) | Crack density (mm/mm$^2$) |
|---|---|---|---|
| Example 1 | 380 | 16 | No crack |
| Example 2 | 327 | 21 | No crack |
| Example 3 | 385 | 17 | No crack |
| Example 4 | 330 | 20 | No crack |
| Comparative Example 1 | 320 | 10 | 0.5 |
| Comparative Example 2 | 378 | 7 | 1.6 |
| Comparative Example 3 | 335 | 5 | 2.3 |

Finally, it should be noted that the above examples are used to illustrate the technical solutions of the present disclosure merely, but not to limit them. Although the present disclosure has been described in detail with reference to the foregoing examples, those of ordinary skill in the art should understand that the technical solutions described in the foregoing examples can be modified, or some or all of the technical features thereof can be equivalently replaced. These modifications or replacements do not render the essence of the corresponding technical solutions deviate from the scope of the technical solutions of the examples of the present disclosure.

The invention claimed is:

1. A nickel-based superalloy, wherein the nickel-based superalloy is prepared by 3D printing using the following raw materials:

the raw materials consists of following composition by mass percentage: 0.2-0.28% of C, less than 5% of Co, 13-15% of W, 20-24% of Cr, 1-3% of Mo, 0.2-0.5% of Al, less than 0.1% of Ti, less than 3% of Fe, 0.01-0.014% of B, 0.001-0.004% of La, 0.01-0.2% of Mn, and 0.02-0.2% of Si, with a balance being Ni;

the nickel-based superalloy has no cracks; in the microstructure of the nickel-based superalloy, an average size of carbide is 150-200 nm, and a size distribution of the carbide is 50 nm-4 μm;

the carbide in the nickel-based superalloy comprises primary carbides and secondary carbides;

the primary carbide has a size of 200 nm-4 μm and is located in a W and Mo elements enriched region between dendrites and cellular crystals; the secondary carbide has a size of 50-150 nm and is located partially at an interface and partially inside a grain, wherein the 3D printing is the selective laser melting, and process parameters during the selective laser melting comprise:

(a) laser power: 100-700 W;
(b) laser scanning speed: 600-2000 mm/s;
(c) spot diameter: 40-110 μm;
(d) laser spacing: 80-120 μm; and
(e) powder thickness: 20-80 μm.

2. The nickel-based superalloy according to claim 1, wherein the raw materials comprise following composition by mass percentage:

0.2-0.28% of C, less than 5% of Co, 13-15% of W, 20-24% of Cr, 1-3% of Mo, 0.2-0.5% of Al, less than 0.1% of Ti, less than 3% of Fe, 0.01-0.014% of B, 0.001-0.004% of La, 0.01-0.1% of Mn, and 0.02-0.1% of Si, with a balance being Ni.

3. The nickel-based superalloy according to claim 1, wherein the raw materials comprise the following composition by mass percentage:

0.2-0.25% of C, less than 5% of Co, 13-15% of W, 20-24% of Cr, 1-3% of Mo, 0.2-0.5% of Al, less than 0.1% of Ti, less than 3% of Fe, 0.01-0.014% of B, 0.001-0.004% of La, 0.01-0.06% of Mn, and 0.02-0.06% of Si, with a balance being Ni.

4. The nickel-based superalloy according to claim 3, wherein the nickel-based superalloy is prepared by following steps: firstly processing the raw materials into powders with a particle size of 15-75 μm, and then performing the selective laser melting.

5. The nickel-based superalloy according to claim 4, wherein the selective laser melting is followed by hot isostatic pressing and heat treatment.

6. The nickel-based superalloy according to claim 5, wherein the nickel-based superalloy has a yield strength greater than or equal to 50 MPa at 1100° C.; and an obtained nickel-based superalloy before the hot isostatic pressing has a density greater than or equal to 99%, and the nickel-based superalloy obtained after the hot isostatic pressing has a density greater than or equal to 99.95%.

7. A component, comprising the nickel-based superalloy according to claim 1.

* * * * *